April 12, 1938.  J. G. HEASLET  2,114,263
APPARATUS FOR SEPARATION OF VEGETABLES
Filed Oct. 16, 1934    2 Sheets-Sheet 1
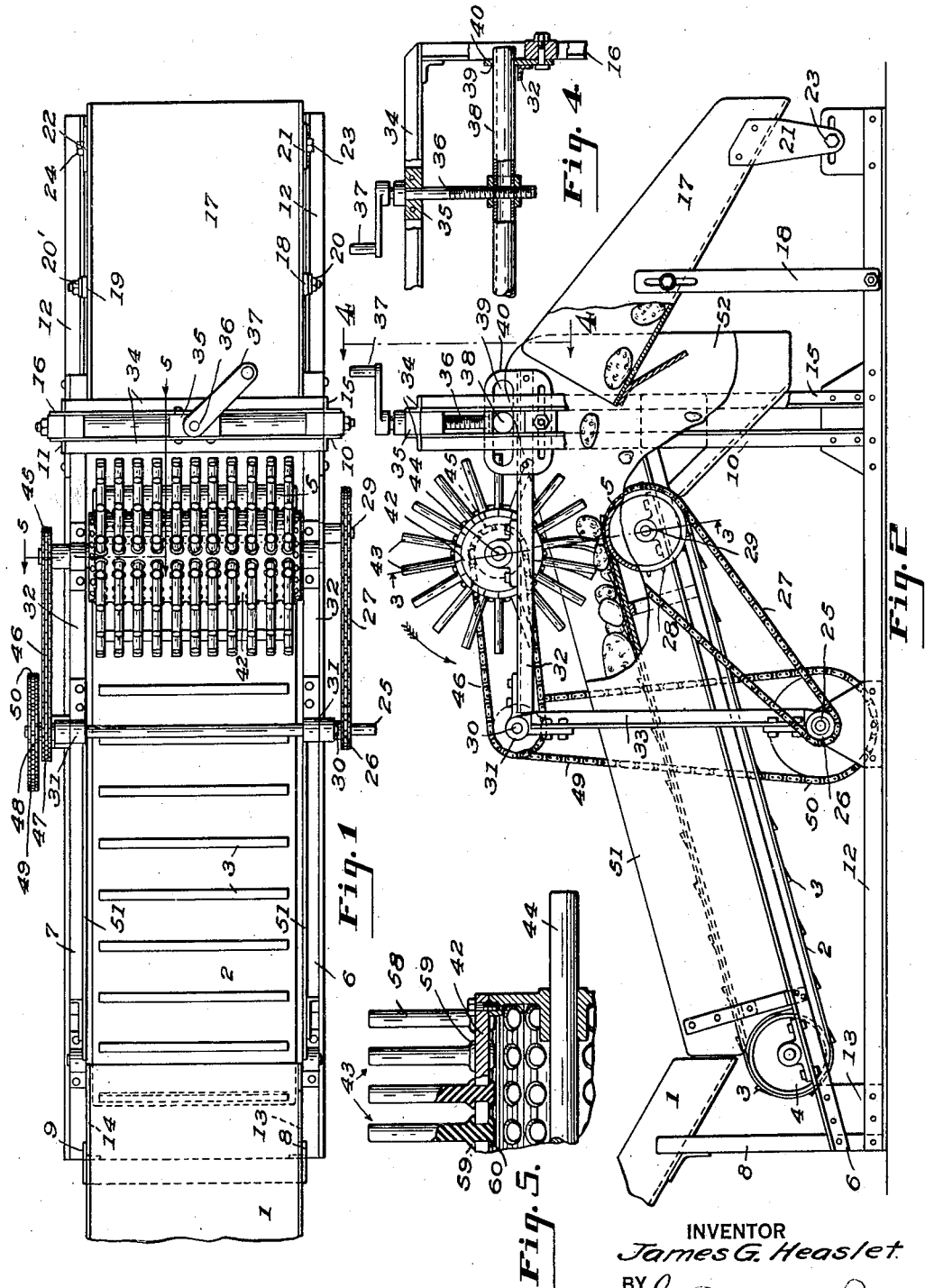
INVENTOR
James G. Heaslet
BY George Douglas Jones
ATTORNEY April 12, 1938.   J. G. HEASLET   2,114,263
APPARATUS FOR SEPARATION OF VEGETABLES
Filed Oct. 16, 1934   2 Sheets-Sheet 2

INVENTOR
James G. Heaslet.
BY
George Douglas Jones.
ATTORNEY

Patented Apr. 12, 1938

2,114,263

UNITED STATES PATENT OFFICE 2,114,263

APPARATUS FOR SEPARATION OF VEGETABLES

James G. Heaslet, Cleveland, Ohio

Application October 16, 1934, Serial No. 748,526

2 Claims. (Cl. 209—120)

This invention relates to a separator and, more especially, to a device for separating tubers and other vegetables from admixtures of dirt and stones. One of the problems on large farms, particularly on those producing quantities of tubers and other earth-embedded vegetables, is the harvesting and separation therefrom of the quantities of stones which are picked up by the digging machines. This is especially true in digging potatoes, for the plows or digging fingers which excavate the potatoes also carry to the conveyors of the conventional machines stones, trash, and the plant portions of the potatoes.

The primary object of this invention is to construct a machine which will rapidly separate the potatoes or other vegetables from the rocks and stones which are dug up with them.

A further object of the present separator is to remove the vegetables from the admixture and convey them, regardless of their size, to one depository, while discharging in a second depository all the refuse material.

In the drawings, Fig. 1 is a top plan view.

Fig. 2 is a side elevation, partly broken away to show the flexing of the separator fingers.

Fig. 4 is a fragmental section taken on line 4—4 of Fig. 2.

Fig. 5 is a fragmental section taken on line 5—5 of Fig. 1.

Figure 3:
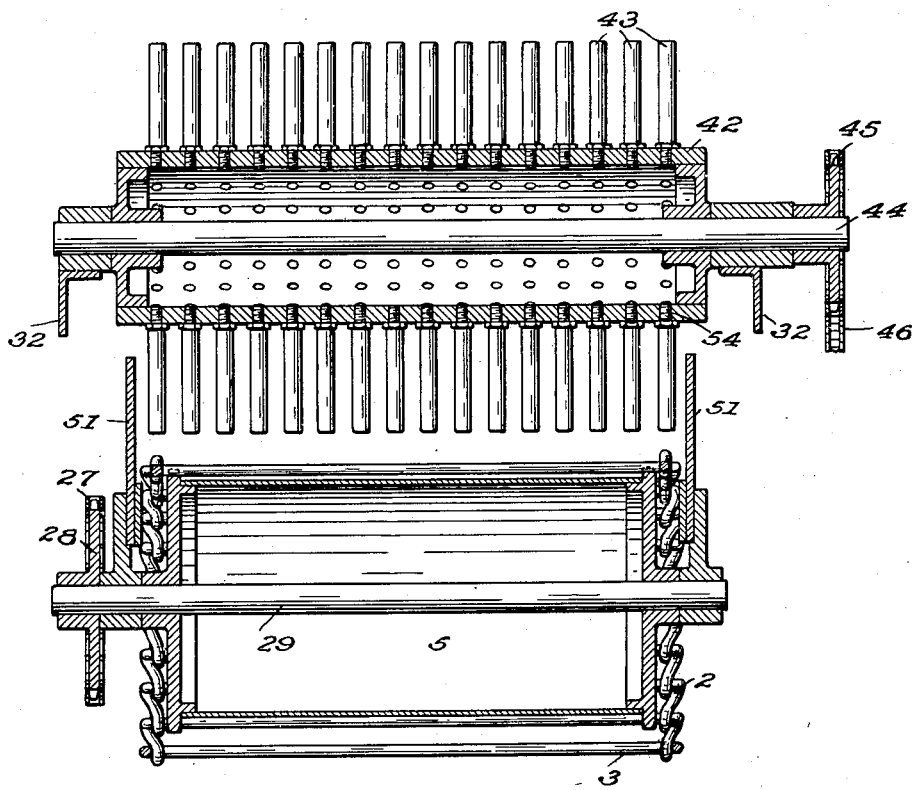
Fig. 3 is a vertical cross-section taken on line 3—3 of Fig. 2.

More specifically in the drawings, 1 is an inclined chute discharging admixtures of tubers and stones, vegetables and stones, etc., onto an endless conveyor belt 2 having a series of transverse cleats 3 formed on its outer surface. The endless conveyor belt 2 is supported at its ends over drums 4 and 5 journalled on suitable axles and bearings to the side frames 6 and 7.

As shown in Fig. 2, the inclined side frames are composed of angle irons 6 and 7 secured at their lower ends to vertical uprights 8 and 9, and at their upper ends to vertical angle irons 10 and 11. The uprights 8 and 9 and the angle irons 10 and 11 are riveted to a horizontal rectangular ground-engaging frame 12. Corner gusset plates 13 and 14 tie the lower vertical uprights 8 and 9 to the horizontal frame 12 and inclined side frames 6 and 7.

Slightly spaced apart from and parallel to the vertical angle irons 10 and 11 are similar angle irons 15 and 16, also rigidly secured to the horizontal bottom frame 12. An inclined discharge chute 17 is mounted above and secured to the end portion of the bottom frame 12; and, as will be observed, vertical arms 18 and 19 are adjustably fastened to the opposite sides of the chute 17 by means of elongated slot and bolt connections 20 and 20'. The lower end of the chute 17 is also adjustably supported on depending side braces 21 and 22, cooperating with elongated slot and bolt connections 23 and 24.

Journalled in side plates affixed to the side frames 12 and approximately beneath in the center of the conveyor 2 is a transverse shaft 25. One end of this shaft carries a sprocket wheel 26 meshing with drive chain 27, the chain passing over sprocket wheel 28 carried on an extension of shaft 29 which supports upper conveyor drum 5, thus movement is imparted to the conveyor belt 2.

In parallel alignment with shaft 25 is an elevated shaft 30, journalled in corner bearings 31—31, the bearings being carried by horizontal parallel arms 32—32 and vertical arms 33—33. The horizontal arms 32—32 extend rearwardly between the spaced parallel vertical angle irons 10—11 and 15—16 and are affixed to an adjustable carrier hereinafter described in detail, which is slidable along and between the pairs of vertical angle irons 10—11 and 15—16. As shown in Fig. 1, the upper ends of these vertical angle irons are tied together by a pair of horizontal angle members 34—34, between which is mounted a bearing block 35 carrying a screw-threaded shaft 36, fitted with a crank handle 37, and threaded through a horizontal bar 38 which is carried in slot 39 formed in the side plates 40—40. Followers 41—41, bolted to the side plates 40—40 through an elongated slot connection, keep the entire assembly in vertical alignment. This arrangement constitutes an adjustable carrier for regulating the horizontal position of the arms 32—32.

Positioned above the upper conveyor drum 5 and journalled between the parallel arms 32—32 is a hollow driven separator drum 42 having parallel rows of resilient fingers 43 fastened to its outer periphery. The separator drum is mounted on a shaft 44 which also carries drive sprocket 45 on one end thereof, power being applied to the sprocket through endless chain 46. The chain is supported over a second sprocket 47 splined on the extension of shaft 30. A sprocket 48 is affixed to the end of the shaft 30 and is driven by chain 49 carried over large sprocket 50 affixed to the end of the bottom shaft 25. The shaft 25 receives power from any suitable source, not shown, and through the chain drives previously described, supplies power to the conveyor belt and separator. It should be noted that this arrangement rotates the separator drum at a somewhat higher rate of speed than the conveyor drums are rotated.

Side boards 51 are mounted on the side frames 6 and 7 to confine the material on the conveyor belt. At their upper ends the side frames are continued downward at 52 and bridge the space or gap between the upper end of the conveyor belt and the discharge chute.

Figure 7:
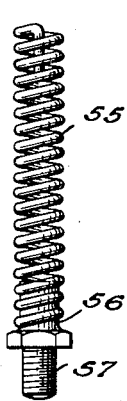
Fig. 7 is a modified form of spring finger.
Figure 6:
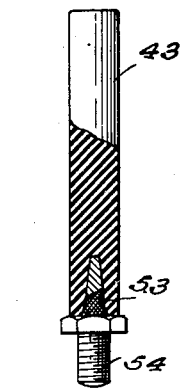
Fig. 6 is a detail of one form of resilient finger, partly broken away.

As disclosed in Figs. 5, 6, and 7, the resilient separator fingers may be constructed of rubber or they may be in the form of coil springs. Fig. 6 illustrates the construction when the fingers are screw-threaded into the separator drum. Here the rubber finger 43 is vulcanized onto a knurled cone 53 which forms an extension on the hexagonal headed screw 54.

In Fig. 7 the coil spring fingers 55 are welded or brazed to a cylindrical extension 56 formed on the hexagonal headed screw 57. Fig. 5 shows molded rubber fingers 58 provided with flared flanges 59 and 60 bearing on the inner and outer surfaces of the separator cylinder 42.

Operation

As an admixture of tubers, trash, stones, etc., is dumped into the chute 1, the mass falls upon the endless conveyor 2 where it is moved upwardly and comes in contact with the parallel rows of resilient fingers on the separator drum 42. The difference in the objects to be separated permits the flexed resilient fingers to throw or project the potatoes or other vegetables from the end of the conveyor into the discharge chute 17. On the other hand, the rocks, trash, etc., respond differently to the impact force exerted by the resilient fingers and cannot be thrown over to the chute 17, but fall in the gap or space between the end of the conveyor and the discharge chute. Aside from the different frictional contact set up in the resilient fingers by the tubers and stones, there is also the difference of their relative specific weights.

To insure proper separation an adjustment can be secured, which takes care of the general sized potatoes to be separated, through handle 37 and screw 36. This adjustment determines the closeness to which the ends of the resilient fingers pass over the upper end of the conveyor.

In practical demonstrations it has been found that the present apparatus will expeditiously and economically separate tremendous quantities of admixtures of stones and tubers. The machine is practically unfailing in its separation and there is an infinitesimal loss by reason of damage to the potatoes.

What I claim is:

1. An apparatus for separating stones from tubers, including a conveyor for moving a mixture of stones and tubers and means for continuously beating the said mixture while supported on said conveyor with a plurality of rotating resilient fingers projecting radially from a rotating drum to thereby project different portions of the mixture in accordance with their specific gravities, the said fingers being of such resiliency as to project the stones contained in the mixture a lesser distance than the said fingers project the tubers therein.

2. An apparatus for separating admixtures of tubers and stones which includes an incline conveyor on which said admixtures are deposited, a tuber chute spaced from said conveyor by an open gap, a rotary drum mounted adjacent the end of said conveyor, a plurality of resilient fingers attached to and projecting from the outer surface of said drum, the said fingers being of such resiliency as to project the tubers and stones from the highest portion of the conveyor and rotating the said drum at a rate sufficient to permit the said resilient fingers to create an impact sufficient to project the potatoes over the said gap and insufficient to project the stones thereover.

JAMES G. HEASLET.